United States Patent Office 3,423,217
Patented Jan. 21, 1969

3,423,217
METHOD OF MAKING CERAMIC SHAPES
Emil Blaha, Cheltenham, Pa., assignor to Selas Corporation of America, a place of business at Dresher, Pa., a corporation of Pennsylvania
No Drawing. Filed July 11, 1963, Ser. No. 294,242
U.S. Cl. 106—39    6 Claims
Int. Cl. C03c 3/04; C03c 7/00; C04b 35/18

The present invention relates to ceramics and more particularly to a method of making various ceramic shapes, such as tiles, and the material of which they are made.

An object of the invention is to provide a method of preparing a ceramic mix that can be fired in a relatively short time and at a relatively low temperature.

A more specific object of the invention is to manufacture a tile, either glazed or unglazed, by a method that is readily adapted to be completely automated.

In practicing the invention, a glass-like material is made first. This material has a composition of calcium oxide or magnesium oxide, or a combination of the two, of from 8%–28% by weight and preferably about 18%; alumina 10%–25% by weight and preferably about 15%; with the remainder being silica. The calcium oxide and magnesium oxide can be obtained from materials such as, for example, as lime or limestone and dolomite. Most materials of this class, when heated, give off volatiles in varying amounts, resulting in a loss of weight, depending upon their composition. This loss of weight must be compensated for, in a manner well known in the art, by using a larger amount of material in the green batch to obtain the desired amount of material in the final product. The amount of calcium oxide in the glass material is called the "oxide equivalent" of the original amount of limestone, for example, that is used in the green batch. The alumina can be obtained from clay, for example, and enough must be used to compensate for any volatiles lost during firing. The silica can be obtained from sand. Normal impurities in a batch of this type will generally be about 2% and will usually occur in the clay used to furnish the necessary alumina.

The raw materials are mixed and fused in a suitable furnace such, for example, as a furnace of the type that is used to melt glass batch. The material has a fusing range of from 2100° F. to 2800° F., and will melt sufficiently at about 2500° F. When the material is melted, it is drawn from the furnace and quenched. This can be and is preferably done on a continuous basis. The quenched material, which is actually a glass, is then ground or pulverized, preferably to the limits of normal grinding for 200 mesh. Other size grinding may be used, depending upon the final product to be made.

The pulverized material produced as above is mixed with up to 25% by weight, and preferably about 15%, of ball clay and up to 25% by weight, and preferably about 15%, of talc. The dry ingredients have added to them enough water to permit them to be pressed to shape. If an intricate shape is to be made, enough water can be added to the dry ingredients to permit slip casting. In the mixture, the ball clay acts as a green binder and plasticizer to hold the mixture together. The talc acts as a filler and lubricant to control shrinkage during firing and facilitate the flow of the mixture in a die. These ingredients are mixed, with the amount of ball clay, talc and water in percentages required for the product being made, and pressed to shape.

If the product being made is to be an unglazed tile, the pressed shape is ready to be fired. If the tile is to be gazed, the shape can be sprayed with any suitable glaze, which may well be an acid-proof enamel modified to match the expansion of the ceramic.

The pressed shape is fired at a temperature of from 1700° F. to 1750° F. for a period of about 90 minutes. Within the temperature range specified, the originally prepared pulverized material will, during firing, be sintered to form, with the clay and talc, a rigid body. As noted above, the porosity of the body and the shrinkage during firing depends primarily upon the amount of talc, with more talc increasing porosity and reducing shrinkage. During this firing, the glaze, if it is used, will fuse to form a vitrified surface on the shape.

The final firing of the product is at a low enough temperature so that normal heat resistant alloys can be used for handling the shapes in a single layer as they are moved through the firing zone of a kiln or furnace. Preferably the pressed shapes are placed on a conveyor belt and moved continuously through the furnace which may be of the muffle type or open fired. This low firing temperature also results in less shrinkage of the shapes as they are being fired with a resultant reduction in warpage. The relatively short firing cycle permits a continuous kiln of this type to be of a practical length.

It is intended that the various steps of the process, including mixing of the ingredients, firing, grinding and pressing to shape, be performed in sequence with apparatus that is presently available and well known in the art.

The description has been centered around the manufacture of tile, a flat, thin product. It will be apparent that the material can be pressed or cast into various other shapes. The low temperature and speed with which the material may be fired makes the process quite suitable for shapes having a wide variation in thickness at different sections.

What is claimed is:
1. The method of making a ceramic shape which comprises mixing ingredients into a batch which will produce a material that is essentially glass consisting of from 8% to 28% by weight of material selected from the group consisting of calcium oxide and magnesium oxide and a mixture of the two, from 10% to 25% by weight of alumina and the remainder silica, melting the batch, quenching it, pulverizing the quenched material and mixing it with from about 15% up to 25% by weight of ball clay and from about 15% up to 25% by weight of talc, moistening the latter mixture sufficiently to shape it, shaping it, and firing the shape to a temperature and for a time sufficient to sinter the pulverized glass batch to form a rigid ceramic shape.

2. The method of claim 1 in which the shape is covered with glaze before it is heated.

3. The method of claim 1 in which the shape is heated to from about 1700° F. to 1750° F. for about 90 minutes to fire it.

4. The method of making a ceramic shape which comprises making a material from a batch comprising from 8% to 28% by weight calcium oxide equivalent of lime, from 10% to 25% by weight alumina, and the balance silica, melting the batch to make the material, withdrawing the melted batch from the place of melting, quenching it and grinding it to about 200 mesh, mixing with the ground material from about 15% up to 25% ball clay, from about 15% up to 25% talc and enough water to mold the mix, pressing the mix to a desired shape, and firing it at from 1700° F. to 1750° F. for about 90 minutes to form a ceramic article.

5. The method of making a ceramic shape which comprises mixing ingredients into a batch which will produce a material consisting of material selected from the group consisting of calcium oxide and magnesium oxide and mixtures of the two in amounts of about 18%, alumina about 15% with the remainder being silica, heating the batch to melt it, quenching the melted material, pulverizing the quenched material, mixing the pulverized material with ball clay in the amount of about 15%, and with talc in the amount of about 15%, adding water to the last mentioned mixture in an amount sufficient for said mixture to be shaped to a desired form, shaping said mixture and firing said mixture at a temperature and for a time sufficient to sinter the quenched material therein to form a rigid ceramic shape.

6. The method of claim 5 in which the surface of the shape is coated with a glaze prior to firing whereby the glaze is fused as the pulverized material is being sintered.

References Cited

UNITED STATES PATENTS

| | | | |
|---|---|---|---|
| 1,346,874 | 7/1920 | Bellamy | 106—46 |
| 2,159,349 | 5/1939 | Bennett | 106—45 |
| 2,741,008 | 4/1956 | Snoddy | 106—45 |
| 2,776,899 | 1/1957 | Donahey | 106—45 |
| 3,022,180 | 2/1962 | Morrissey | 106—39 |

OTHER REFERENCES

Jonas: "The Sealing of Metal Leads Through Hard Glass & Silica," Philips Technical Review, vol. 3 April 1938 pp. 119–120.

HELEN M. McCARTHY, *Primary Examiner.*

U.S. Cl. X.R.

106—46, 48, 52, 62, 63